United States Patent [19]

Riemann et al.

[11] 4,445,906
[45] May 1, 1984

[54] PROCESS FOR THE TREATMENT OF THE COMBUSTIBLE PORTION OF DOMESTIC WASTE FOR BRIQUETTING AND APPARATUS THEREFOR

[75] Inventors: Hanns-Helmut Riemann, Bochum; Hans Sonnenschein, Essen, both of Fed. Rep. of Germany

[73] Assignee: Mannesmann Veba Umwelttechnik GmbH, Herne, Fed. Rep. of Germany

[21] Appl. No.: 399,295

[22] Filed: Jul. 19, 1982

[30] Foreign Application Priority Data

Jul. 18, 1981 [DE]  Fed. Rep. of Germany ....... 3128560

[51] Int. Cl.³ .......................... C10L 5/00; C10L 5/08
[52] U.S. Cl. .......................................... 44/1 D; 44/2; 44/10 R; 44/10 E; 241/28; 209/289
[58] Field of Search ................. 44/1 D, 2, 11, 12, 13, 44/10 R, 10 E, 10 G; 209/289; 241/23, 24, 28

[56] References Cited

U.S. PATENT DOCUMENTS 3,910,775 10/1975 Jackman ............................... 44/1 D
4,095,956  6/1978 Holmes ..................................... 44/2
4,164,396  8/1979 Jones ......................................... 44/2

*Primary Examiner*—Delbert E. Gantz
*Attorney, Agent, or Firm*—Oblon, Fisher, Spivak, McClelland & Maier

[57] ABSTRACT

A method and apparatus for the treatment of the combustible portion of crushed domestic waste. The waste is pre-dried and separated from dense-medium material such as metal and glass prior to processing. A dried waste moisture level of about 8–10% is maintained throughout the process. High heat value briquets are produced without the addition of a bonding agent by sifting out fine inert material and plastic material prior to briquetting.

4 Claims, 1 Drawing Figure

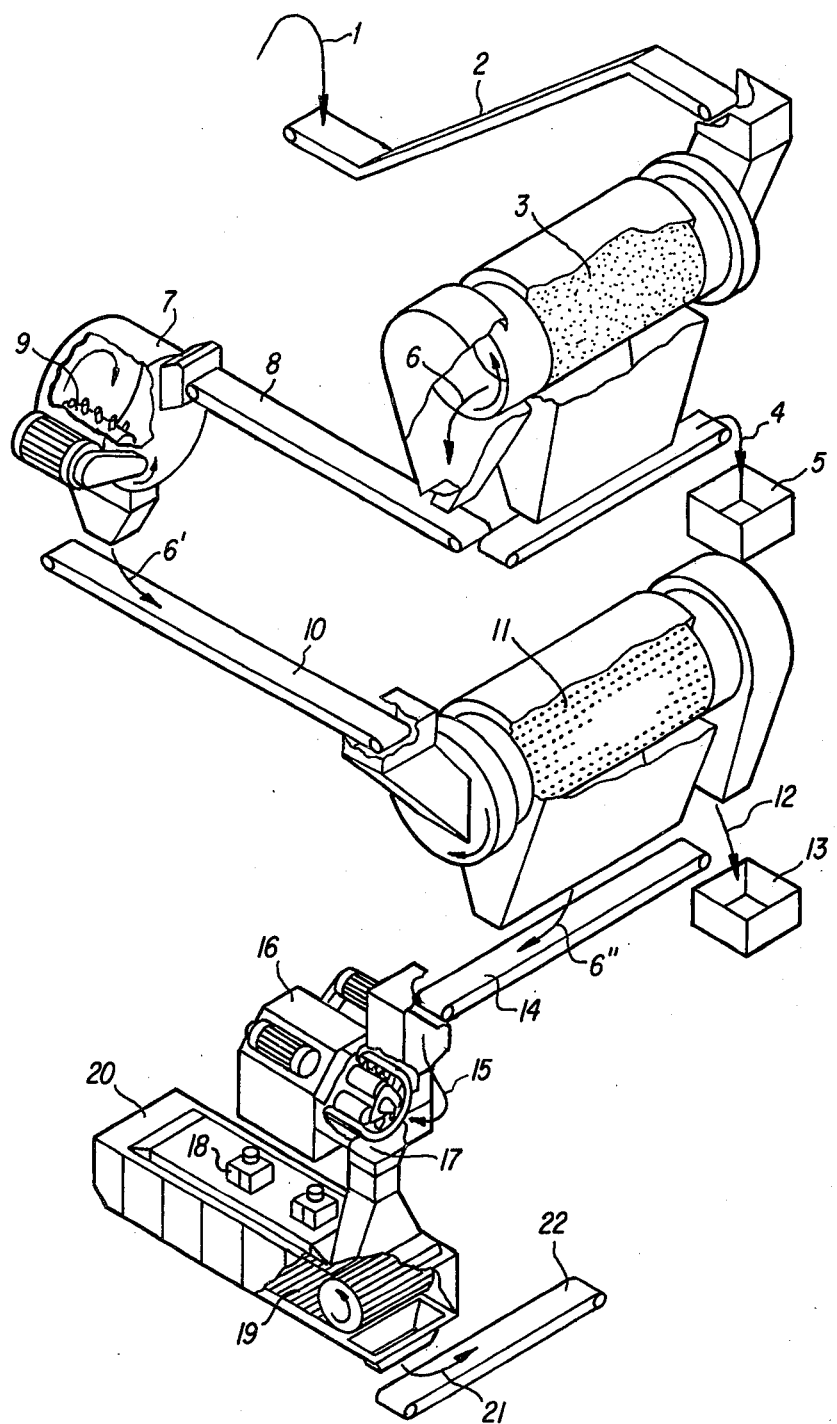

PROCESS FOR THE TREATMENT OF THE COMBUSTIBLE PORTION OF DOMESTIC WASTE FOR BRIQUETTING AND APPARATUS THEREFOR

BACKGROUND OF THE INVENTION

1. Field of the Invention

The invention concerns a process for the treatment of the combustible portion of crushed domestic waste with dense-medium material being removed and being dried to a residual moisture of 8 to 10% before entering a briquetting press. The domestic waste is frayed in its dry condition after fine inert material has been sifted out.

2. Description of the Prior Art

In a known process household garbage is crushed in a hammer mill and is dried in a suspended drier while the dense-medium material is removed, and the combustible fraction separated in this way is supplied to a briquetting press without any subsequent treatment. The bonding of the particles during the briquetting is effected to a smaller extent by the fibrous edges of cellulose-rich particles, such as pieces of paper, which develop during crushing in the hammer mill but to a larger extent by the flying fine inert particles passing in a considerable amount in an upward direction through the suspended drier. The fine inert particles have greater bonding power because the fibrous edges of the cellulose-rich particles produced in the moist original condition of the garbage are so soft that they are mechanically blunted when transported to the suspended drier and in the drier itself such that the edges become mostly smooth. The briquets produced in this way have only a moderate heating value owing to the fine inert portion.

The property of fine inert particles to act as a bonding agent is still more distinct in another known process (German Pat. No. 25 10 465) in which, after a coarse crushing of the household garbage, the entire inert portion remains in the transported substance during its passage through a disintegrator and is dried together with the treated material. There exists no separated combustible fraction. Consequently, the briquets which are produced without an additional mixed-in bonding agent have such a low heating value that they are practically unsuitable to be burned but are intended to be gasified in a gas generator. This process has no relation to the present invention.

SUMMARY OF THE INVENTION

It is the purpose of the invention to treat the combustible fraction of the household garbage which is dried and the dense-medium material of which is removed in such a way that transportable and storable briquets can be produced with a relatively high heating value without adding any bonding agent. In order to accomplish this task, the invention provides for the treatment of the combustible portion of crushed domestic waste with dense-medium material being removed and being dried to a residual moisture of 8 to 10% before entering a briquetting press. The domestic waste is frayed in its dry condition after fine inert material has been sifted out.

The sifting-out of the fine inert material and the fraying of the cellulose-rich material in its dry condition imply each other as is substantiated in the subsequent description of an example.

Owing to the sole bonding capability of cellulose-rich material due to the fraying in its dry condition, plastic particles which are mixed into the substance and cannot be frayed have an interferring effect. This is also because plastic foil leaves the disintegrator in by far larger sizes than pieces of paper which have, for example, only dimensions of a few millimeters. Therefore, the invention provides for the removal of such plastic foil.

BRIEF DESCRIPTION OF THE DRAWING

Various other objects, features and attendant advantages of the present invention will be more fully appreciated as the same becomes better understood from the following detailed description when considered in connection with the accompanying Sole drawing wherein the Sole isometric Figure shows a system for the treatment and briquetting of the combustible fraction of household garbage.

DETAILED DESCRIPTION OF THE PREFERRED EMBODIMENT

A bulk substance 1 is continuously placed on an upward leading conveyor belt 2. The bulk substance 1 consists of household garbage or domestic waste which has been first subjected to a coarse crushing and separation of dense-medium material, such as metallic parts, stones, glass parts, etc. The bulk substance has also passed through a drier and has a residual moisture, if possible, of 8 to 10%. The bulk substance 1 can, therefore, be called a dried combustible fraction of crushed household garbage.

From the belt 2, the bulk substance enters one end of a fine screening drum 3 in which fine inert material, such as ash, is separated, by falling, as indicated by arrow 4, into a container 5. The dried combustible fraction of the household garbage 6 from which the fine material is removed, consisting essentially of cellulose-rich material, such as paper, remains of food and plastic foils, emerges from the opposite end of the screening drum 3 where it falls on a belt 8 leading to a disintegrator 7. The disintegrator has a fast rotating drum 9 which is equipped with pointed tools.

The fraying of the cellulose-rich material in its dry condition results in shreds having dimensions of one to a few millimeters. The edges are fibrous whereby the fibers are sufficiently resistant to blunting owing to their dry condition in order to be mostly preserved intact during the continued transporting.

The next treatment station of the fraction 6', which is now frayed, is a coarse screening drum 11 to which fraction 6' is conveyed by a belt 10. The plastic foil parts which have been torn apart in the disintegrator but still form large bodies are retained in the drum 11 and drop into a container 13 as indicated by arrow 12. The remaining fraction 6'', which is now practically free from plastic material, is supplied on an underlying belt 14 and carried thereby to a briquetting press 16 designed as an edge-runner press which can be axially fed as indicated by arrow 15. The press has an annular-shaped, slowly rotating matrix 17 which is provided with a multitude of punching dies having a diameter of, for example, 20 mm.

The surfaces of the fibrous shreds become rough through friction with the compression pressure of the substance in the order of magnitude of about 300 bar and a temperature of 100° C. or more. The roughness and serration of the fibrous edges effect by themselves such a right consolidation of the substance that the line of briquets radially leaving the matrix break off into briquet pieces of 50 to 100 mm lengths, for example, by touching a wall. The purposely left residual moisture evaporates then partially but at such a low rate that no expansion bubbles reducing the resistance of the briquets can develop with the fast pressure decrease which occurs with the discharge through the matrix holes.

The briquets almost reach room temperature in a cooling box 20 provided with fans 18 and a belt 19 and are discharged from the described treatment area on a belt 22 in accordance with arrow 21.

The better the screening-out of the fine inert material and plastic foils is handled, the more effectively the fibrous edges produced in their dry condition become matted with each other. Actually, to the extent that the fine inert material is not present in such proportions in the substance so briquetted as heretofore, there is not a bonding effect but more of a bond preventing one. This is a mutual condition in order to obtain briquets with a relatively high heating value. Bonding agents, such as an inert material carried along with the substance, reduce the heating value and such additionally mixed-in combustible bonding agents raise the cost of the briquets.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the treatment of a cellulose containing combustible portion of crushed domestic dried waste free from dense material, said process using a fine screening drum, a disintegrator, a coarse screening drum and a briquet press wherein said process comprises the steps of:
   drying said waste to a residual moisture content of about 8–10%;
   sifting fine inert material from said dried waste with said fine screening drum to form a combustible waste portion without fines;
   introducing said combustible waste portion without fines into said disintegrator to shred and fray said combustible waste portion without fines; and
   introducing said shredded and frayed combustible waste portion into said briquet press to form briquets having a high heating value.

2. The process of claim 1 further comprising sifting plastic particles from said combustible waste portion without fines with said coarse screening drum prior to introduction of said dried waste into said briquet press.

3. An apparatus for the treatment of a combustible portion of crushed domestic dried waste having a residual moisture content of about 8–10% and being free of dense material, said apparatus comprising:
   a dryer for drying said waste;
   a fine screening drum for sifting out fine inert material from said dried waste;
   a disintegrator disposed downstream from said fine screening drum for shredding and fraying said dried waste from said fine screening drum;
   coarse screening means disposed downstream from said disintegrator for removing plastic particles from said dried waste from said disintegrator; and
   means for conveying a material from said dryer to said fine screening drum, from said fine screening drum to said disintegrator and from said disintegrator to said coarse screening means.

4. The apparatus of claim 3 including:
   a briquet press; and
   means for conveying said material from said coarse screening means to said briquet press.

* * * * *